US008229946B1

(12) United States Patent
Crane

(10) Patent No.: US 8,229,946 B1
(45) Date of Patent: Jul. 24, 2012

(54) BUSINESS RULES APPLICATION PARALLEL PROCESSING SYSTEM

(75) Inventor: Keith Alan Crane, Kingsville, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 533 days.

(21) Appl. No.: 12/360,114

(22) Filed: Jan. 26, 2009

(51) Int. Cl.
*G06F 7/00* (2006.01)
*G06F 17/30* (2006.01)
*G06F 15/76* (2006.01)
*G06F 12/00* (2006.01)

(52) U.S. Cl. ......................................... 707/764; 712/28
(58) Field of Classification Search .................. 707/764; 712/28
See application file for complete search history.

(56) References Cited

U.S. PATENT DOCUMENTS

| 5,812,849 | A  | * | 9/1998 | Nykiel et al. | 707/1 |
| 6,182,061 | B1 | * | 1/2001 | Matsuzawa et al. | 707/764 |
| 6,826,556 | B1 | * | 11/2004 | Miller et al. | 707/764 |
| 7,680,765 | B2 | * | 3/2010 | Meijer et al. | 707/764 |
| 7,840,585 | B2 | * | 11/2010 | Ramsey et al. | 707/764 |
| 2003/0036809 | A1 | * | 2/2003 | Landman et al. | 700/4 |
| 2004/0078369 | A1 | | 4/2004 | Rothstein | |
| 2004/0107381 | A1 | | 6/2004 | Bomfim | |
| 2007/0208694 | A1 | * | 9/2007 | Bayliss et al. | 707/2 |
| 2007/0226226 | A1 | * | 9/2007 | Mintz | 707/10 |
| 2008/0278740 | A1 | * | 11/2008 | Bird et al. | 358/1.15 |

OTHER PUBLICATIONS

R. Elmasri and S. B. Navathe. Fundamentals of Database Systems (third edition). Addison-Wesley, New York, Jun. 2000, Title Pages, Preface and Section 7.4, pp. iii, iv, vii, viii and 211-225.*
Khorasani, et al., "IBM Research Report—Parallel Implementation of Relational Database Management Systems Operations on a Multi-Core Network-Optimized System on a Chip", Feb. 27, 2011, IBM Research Division.

* cited by examiner

*Primary Examiner* — Greta Robinson
*Assistant Examiner* — Brian E. Weinrich

(57) ABSTRACT

A business rules application parallel processing system is provided. The system comprises at least one computer system, stored data, and an application that, when executed on the at least one computer system, extracts data from the initially stored data for processing in accordance with at least one business rule. The system also stores the data in a sequential file format as a first data set and partitions the data in the first data set in accordance with the at least one business rule to create a second data set and prepare the data in the second data set for processing. The system also partitions the data in the second data set into partition units appropriate for scaled application processing across multiple processors in the at least one computer system to create a third data set. The system also processes the data in the third data set in a parallel execution across the multiple processors and recombines the data after processing in accordance with the at least one business rule in a fourth data set.

19 Claims, 5 Drawing Sheets

BUSINESS RULES APPLICATION PARALLEL PROCESSING SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Relational databases are built for online transaction processing (OLTP) operations wherein many record-by-record searches and individual record insert and delete operations may be run in high volume processing environments. Data warehousing operations, by contrast, are heavily read-intensive and may draw on and process millions of database rows at a time. Because the controls and safeguards built into relational databases may cause processing overhead and bottlenecks, operations that process a large volume of database rows concurrently may be highly inefficient in consuming database resources and take excessive time to complete. The client-server aspect of relational database technology, while designed to protect databases and insure data integrity, may add processing overhead and significantly retard the speed of an operation drawing large volumes of data from multiple rows and tables. Performing large scale batch processing and data warehouse operations subject to the processing limitations and overhead of database may consume excessive processing resources and be disruptive of regular transaction processing activities.

SUMMARY

In an embodiment, a business rules application parallel processing system is provided. The system comprises an at least one computer system, stored data, and an application that, when executed on the at least one computer system, extracts data from the initially stored data for processing in accordance with at least one business rule. The system also stores the data in a sequential file format as a first data set and partitions the data in the first data set in accordance with the at least one business rule to create a second data set and prepare the data in the second data set for processing. The system also partitions the data in the second data set into partition units appropriate for scaled application processing across multiple processors in the at least one computer system to create a third data set. The system also processes the data in the third data set in a parallel execution across the multiple processors and recombines the data after processing in accordance with the at least one business rule in a fourth data set.

In another embodiment, a method for parallel processing business rules applications is provided. The method comprises submitting at least one query to a database in response to a request from a business rules application that applies at least one business rule and receiving the data returned from the at least one query. The method also comprises converting the data into sequential file format. The method also comprises partitioning and sorting the data in accordance with at least one instruction in the business rules application to one of apply the at least one business rule and prepare the data for further processing to complete application of the at least one business rule.

In another embodiment, a method for parallel processing business rules applications is provided. The method comprises queuing at least one application that applies at least one business rule in one of a single processor and a multiple processor server and accessing partitioned and sorted data from at least one file formatted in one of plain text and binary file format. The method also comprises partitioning the data into partition units wherein the size of the partition units are determined to efficiently utilize the processing capacities of the processors in the server. The method also comprises executing the at least one application to process the partition units in parallel execution across the at least one processor in the server wherein processor usage is balanced and processing comprises at least one of join and summarization operations to produce processing output. The method also comprises combining the processing output in accordance with instructions provided by the application.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
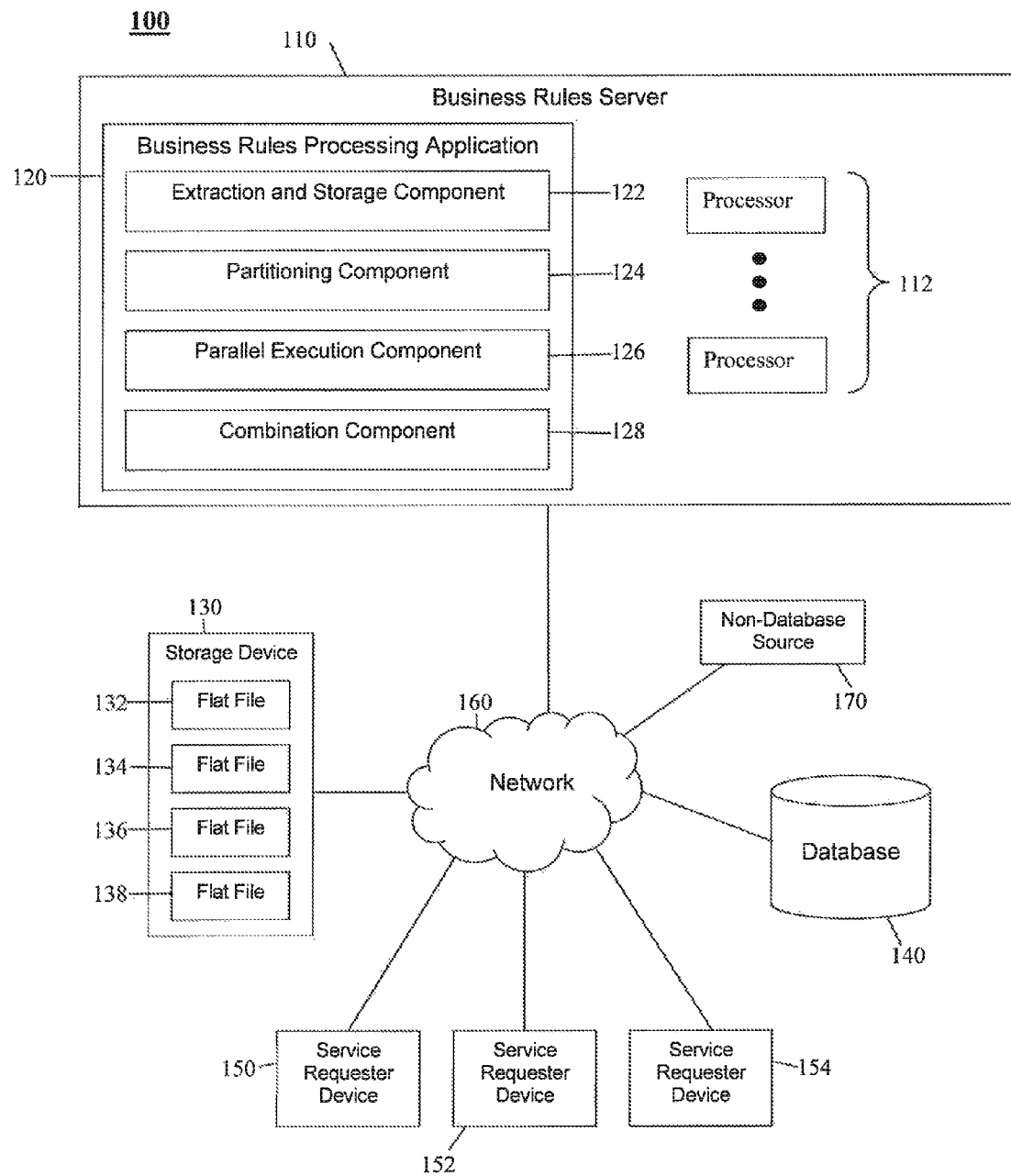
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Several embodiments of a business rules application parallel processing system permit a large quantity of data to be extracted from a database, converted to sequential format, and processed in batch, data warehouse, and other high volume operations outside the database. The system comprises utilities that partition, sort, merge, and join data in a processing environment external to the database. The utilities effectively use the resources of a multiple processor server and may achieve marked processing efficiencies. The system extracts data from a relational database or other source in response to requirements provided by an application that applies business rules to the data. In an embodiment, a mobile telephone service provider with millions of customers may process data files that total hundreds of gigabytes in size or larger. The data returned by the database query or other data access operation is converted to a sequential file format and stored in at least one flat file in text or binary file format based on a key field that may be used in searching. The system then partitions and sorts the data across a plurality of data files in preparation for scaled application processing. The data is sectioned into data chunks or partition units of a size determined to efficiently use the memory and processing capacity of the processors in a multiple processor system. The data chunks or partition units are fed to the processors in a procedure that balances the load of work evenly across processors, promoting efficient memory usage. The processors carry out join, summarization, and other relational operations that apply the business rules specified in the application being executed. Running these partitioning, sorting, merging, and joining operations on sequential files outside of the relational database may permit greater operational and development efficiencies and faster execution of applications that apply business rules to large volumes of data. Relational databases are predominantly used by large organizations with heavy transaction activity with a plurality of customers and a need for data integrity and security. The use of tables, the client-server aspect, and security and locking features have made relational databases popular for the storage of the tabular information that supports large organizations including financial records, manufacturing and logistical information, and personnel data.

In databases that are normalized, data tables are designed to minimize duplication of information and, in so doing, safeguard the database against certain types of logical or structural problems. Accessing data stored in normalized databases for warehousing operations may be more resource intensive because fewer instances of a given piece of information may exist and may therefore require more resources to locate. Higher degrees of normalization typically require more tables within a database. This may further contribute to performance problems when data warehousing operations are conducted within the database. Applications that apply business rules to large quantities of data often involve data warehousing and batch processing operations. These activities may run more efficiently and rapidly when the needed data may be more rapidly accessed, as may be the case in de-normalized database environments. Executing large applications that apply business rules inside of a normalized database using routines that work best in a de-normalized environment can be highly inefficient. Applications that apply business rules hence may process better outside database environments.

In addition to allowing processing efficiencies to be realized when large batch processing and data warehouse operations are performed outside of the database with data files converted to sequential format, application developers also may have greater flexibility in the range of programming languages and tools they may draw upon. A developer creating an application to function inside of a database is subject to the inherent limitations, processing rules, and overhead of the database environment. Applications that apply business rules that can be written to process large volumes of information outside of a database are subject to fewer architecture and processing limitations than database applications. The plain text or binary file format of data, as opposed to database data, is also burdened with less processing overhead and easier to manipulate and subject to application coding by an application developer. The present disclosure also allows data that has been converted to sequential file format, then partitioned and sorted, to be segmented into partition units sized to work efficiently within the resources, including memory, of the processors of a multiple processor server. The present disclosure passes the partition units to the processors in a manner that balances the workload evenly across the processors. The distribution of processing load may permit the tasks, which may comprise high volume relational join or summarization operations, to be completed more rapidly and with more economical use of processor resources than if performed within a database.

Turning now to FIG. 1, a system 100 for business rules application parallel processing is provided. The system 100 comprises a business rules server 110, a business rules processing application 120, a storage device 130, a flat file 132, a database 140, a service requester device 150, a network 160, and a non-database source 170. In most embodiments, the system 100 also includes additional flat files 134, 136, 138 and additional service requester devices 152, 154. Interactions of the flat file 132 may be taken as representative of the flat files 134, 136, 138. Interactions of the service requester device 150 may be taken as representative of the service requester devices 152, 154.

The business rules server 110 may be any general purpose computer system. General purpose computer systems are discussed in greater detail hereinafter. The business rules server 110 may comprise one computer or a plurality of computers, for example a server farm wherein many server computers cooperate to share a processing load. The business rules server 110 may comprise a plurality of computers that are located at different places, for example to provide geographical diversity and increased service reliability. The business rules server 110 may be equipped with one, two, four, eight, or other quantities of central processing units (CPU) 112. Central processing units are also referred to as processors. The business rules server 110 executes one or more applications that provide services to the service requester device 150 including hosting of the business rules processing application 120.

The business rules processing application 120 processes application requests received from service requester devices 150 wherein the requests involve running an application that calls for one or more business rules to be applied to a large volume of data and wherein the data may reside in a database 140. A business rule defines or constrains at least one aspect of an organization and it is intended to assert organizational structure or influence the behavior of the organization. A business rule may pertain to business calculations and focus on enforcement of organizational policies. A retailer may, for example, enforce a business rule mandating that no credit check is to be performed on returning customers. A residential mortgage broker or lender may implement a business rule requiring mortgage applicants to provide proof of annual income including federal income tax returns. Business rules applications may call for regular processing of large quantities of data, such as customer or subscriber lists, wherein the data may reside in a relational database and must be manipulated or combined with other variables and presented in joined table or summarized format. Business rules applications may also apply simple rules to the data that determine whether and to what extent a policy has been followed. In some embodiments, completing the application of at least one business rule may produce intelligence reports supporting decisions about strategy, tactics, and organizational direction. Applications that apply business rules may not involve complex processes, rather large volumes of data that need to be subjected to simple rules or tests and joined or summarized on a regular basis for management use. The high volume and low complexity aspects of business rules application processing lend themselves to flat text and binary sequential file format processing performed external to a relational database.

The business rules processing application 120 comprises the extraction and storage component 122 that receives requests from the service requester device 150 to run business rules applications. The extraction and storage component 122 may store or contain pointers to business rules applications that are run on a repeated and routine basis once per week, per month, or at another regular interval. A business rules application may call for the extraction and storage component 122 to submit one or more queries to the database 140 or submit data access requests to the non-database source 170. A business rules application submitted by the service requester device 150 may contain the queries to be submitted to the database 140 or the business rules application may contain templates or frameworks for queries that the extraction and storage component 122 must complete at each interval with specific information for that cycle. The extraction and storage component 122 may receive data from an external component or party that enables it to complete a query template in the business rules application. The process may be entirely automatic wherein once per week, for example, a certain department in a company furnishes an electronic feed to the extraction and storage component 122 containing information to insert into fields within a query or data access request that is part of a business rules application that the extraction and storage component 122 runs for that department on a regularly scheduled basis.

In an embodiment, the data to be processed may not originate or pass through the database 140, need to be in a database file format, or need to ever have been in database format before being obtained by the extraction and storage component 122. The data may originate from the non-database source 170, may have always been in a sequential file format, or may have originated in yet another file format before being processed by the extraction and storage component 122. In an embodiment, the extraction and storage component 122 may therefore not submit a query to a database 140 to obtain the data. The extraction and storage component 122 may instead execute an instruction or command or follow a procedure appropriate to the file format, processing requirements, and architecture of the non-database source 170 necessary to obtain the data. Requests by components of the system 100 to extract data from non-database sources 170 are referred to herein as data access requests.

The extraction and storage component 122 submits at least one query to the database 140 or data access request to the non-database source 170 as directed by the business rules application and receives the results of the query from the database 140. The query may, in a telecommunications provider environment, for example, ask for a listing of all subscribers by subscriber identification number or account number. When the database 140 runs the query and produces the results, the extraction and storage component 122 receives the query results and copies the results in sequential format to a flat file 132. A flat file 132 is a plain text file that may contain one record per line. In an embodiment involving a mobile telephone service provider, each line in a flat file 132 may contain all information associated with one account or subscriber. Plain text files may also be referred to as files formatted in ASCII (American Standard Code for Information Interchange) format. In the present disclosure, flat file 132 may also comprise files encoded in binary file format. Since databases process queries and may return results in database table format, the extraction and storage component 122 may perform operations on the query results to convert the results to plain text format or binary format. After necessary conversion, the extraction and storage component 122 creates a new instance of the flat file 132 and places the converted query results into the flat file 132. The converted query results appear in the flat file 132 as a sequential file such that the records are arranged in order of a key field wherein the business rules processing application 120 or other component may search for specific records in the flat file 132 using the key.

In an embodiment, the extraction and storage component 122 may not furnish queries to the database 140 or data access requests to the non-database source 170 for large quantities of data every time a business rules application is received by the business rules processing application 120. The extraction and storage component 122 may instead only occasionally query the database 140 or non-database source 170 for a master or full copy of the records in the database 140 or non-database source 170. On a more regular basis, however, the database 140 or non-database source 170 may be queried for incremental updates only since the previous incremental update or full copy. This practice may reduce the processing load on the database 140 or non-database source 170 and may reduce traffic load on the network 160, in particular between the business rules server 110 and the database 140 or non-database source 170. In an embodiment, when parties that are not components of the system 100 are sending updates to the database 140 or non-database source 170 in their normal course of operations and the information in those updates would be useful in updating the corresponding information stored in the flat file 132 in the storage device 130, arrangements may be made for copies of that updating information to be furnished to the flat file 132 for efficiency and expediency purposes so that the updating information does not need to be queried from the database 140 or non-database source 170. This process in effect bypasses or obviates the need to query the database 140 or non-database source 170 for this updating information.

The business rules processing application 120 also comprises the partitioning component 124 that partitions the data copied into the flat file 132. Partitioning of data is completed before data is sorted and subjected to merging, joining, summarization, and other relational operations. The partitioning component 124 uses the key associated with the data in the flat file 132 to partition the data in accordance with the requirements of the at least one business rule to be applied by the business rules application being executed. Data may be partitioned on several levels, for example by subscriber identification or account number, and then by telephone number, and also by account plan a customer may have. How the data is partitioned and at what levels will be dependent upon the needs of the business rules application. As the data is partitioned at various levels and in various ways pursuant to the application requirements, additional keys will be established for files that are created by the partitioning process. These keys will be used later when the partitioned files are joined to produce the final result as required by the business rules application. Control files and wrapper scripts contained within and activated by the business rules application being run prescribe how the data in the flat file 132 is to be partitioned. The partitioning component 124 follows instructions provided during execution of the business rules application that prescribe how the data is to be partitioned, the files that are to be created, and the key definitions provided to the files created during partitioning. As the original flat file 132 created by the extraction and storage component 122 is partitioned at one or more levels and each partition is provided a key definition for later use in joining, additional files created by these operations are given file names and/or partition names.

Partitioning may be affected using various methods that may include range partitioning and hash partitioning. Range partitioning determines what partition to place a record in by determining if the associated partitioning key is inside a certain range. An example could be a partition for all subscribers where the column subscriber identification has a value between 700000 and 799999. Hash partitioning processes subscriber identification or account numbers, for example, through an algorithm. The results of the algorithm determine what partition a subscriber is to be placed in. Partitioning prepares the bulk query results received by the extraction and storage component 122 for the joining and other operations performed later. Further partitioning and filtering at sublevels may create subsidiary partitions that may be joined and summarized in later operations. Keys may be provided to each partition and the keys are used in further partitioning and in the subsequent joining, summarizing, and/or other operations.

The partitioning component 124 also manages the sizing of partitions as well as setting the fields and key definitions within the partitions. In an embodiment, data segmented into partitions and subsidiary partitions may need no further action before being passed to processors. An individual partition or subsidiary partition may comprise a data file and each data file may represent a bottom level unit or partition unit of a partition strategy. Each partition unit may be passed to the processors in a multiple processor server or group of servers such that the processing load will be balanced across the processors. In an embodiment, an individual partition or subsidiary partition may not by itself comprise a single partition unit and may be segmented further into smaller partition units. Depending on the processing requirements of the specific business rules application, the quantity of data being processed, and the hardware capacity available, multiple segmenting steps may be involved to arrive at the optimal size of partition unit. An objective of partitioning is to enable processing of the data in a manner that is favorable to the architecture of the business rules server 110 and in particular the processors in the business rules server 110. The memory caching, clock speed, pipelining capabilities, and other processing characteristics of a central processing unit (CPU) as well as installed memory, bus capacity, and storage of a server are variables to be considered in determining the size component of partition strategy which defines how the data is to be segmented by the partitioning component 124.

The business rules processing application 120 maintains configuration information about the processing capacity of the business rules server 110 and/or other server or servers that perform processing of partitioned data in the present disclosure. The business rules processing application 120 also analyzes business rules applications as they are received from service requester devices 150 and queued for processing. The business rules processing application 120 analyzes the processing routines through which the partitioned data will be passed in joining, merging, summarizing, and other relational operations when executing each business rules application. The business rules processing application 120 considers the processing capacity of available hardware of the business rules server 110, the processing requirements of the business rules application awaiting processing, and the volume and type of data that will be processed in determining a strategy for processing the data that has been partitioned into partition units.

A mobile telephone service provider may partition records of subscriber account numbers, phone numbers, and plan agreement types all by common field key of subscriber identification number such that the initial result is three very large record listings: the first lists subscribers with corresponding account number, the second lists subscribers with corresponding mobile phone number, and the third lists subscribers with corresponding subscription plan agreement type. The mobile telephone service provider may wish to partition these three large lists further by additional criteria to meet the requirements of a business rule. The partitioning component 124 performs this additional partitioning and conducts necessary sorting. The partitioning component 124 concurrent with or after the data is partitioned and placed in the smaller and more specifically defined partitions, performs the additional step of determining the parallelization strategy for processing when the subsequent joining, summarizing, or other relational operations are to begin.

While the parallelization strategy is determined to utilize the processing capabilities of processors and other components within the business rules server 110 in as optimal a manner as possible, in an embodiment it may be desirable that each partition unit is inclusive of the key or multiple keys required for the join or summarization tasks required by the business rules application being executed. Each partition unit that is passed to a processor for processing by the business rules processing application 120 contains the key or keys for that partition unit to be processed autonomously from other partition units. The resulting output from the processing operation applied to a specific partition unit is processed and only needs to be placed back in the same order with the processing output of the partition unit that preceded and succeeded it. During join and summarization processing of a partition unit, a processor does not need to access information from a different partition unit to complete the processing of its subject partition unit.

The business rules processing application 120 also comprises the parallel execution component 126 that feeds the partition units to the processors in the business rules server 110 during the execution of a business rules application. The parallel execution component 126 also regulates the execution of a business rules application by the business rules server 110 as the processors apply business rules to partition units fed to it. While the partitioning component 124 creates partitions from data, further segments the partitions into smaller partitions according to business rules, and may slice the partitions into smaller partition units to facilitate processing, the parallel execution component 126 feeds the partition units to the processors in the business rules server 110 when the join, summarization, or other relational operations have commenced. As with the partitioning component 124, the parallel execution component 126 also follows instructions received from both the business rules processing application 120 regarding hardware capabilities and from the business rules application being executed regarding join and other execution operations it may need to be completed. The parallel execution component 126 monitors the execution of the business rules application by the business rules server 110. As the business rules server 110 may be a multiple processor server, the parallel execution component 126 seeks to balance the processing load of the business rules application throughout its execution over the available processors. Before the parallel execution component 126 begins feeding the partition units to the processors, the optimal size of the partition units has already been determined. It is the role of the parallel execution component 126 to distribute the processing of those partition units across the processors in the business rules server 110 during the execution of the business rules application to efficiently use the processors and complete processing expeditiously. While the partition units may be of similar size, they may not be processed at the same speed. No two or more partition units are likely to contain the same partitioned data and be subjected to the same processing instructions. The parallel execution component 126 observes as the processors execute instructions on successive partition units and determines the processor that should receive the next partition unit to be processed. The objective of the parallel execution component 126 is to achieve efficient and expeditious processing of data and rapid and correct completion of business rules applications.

The business rules processing application 120 also comprises the combination component 128 that combines the output resulting from the processing of the partition units by the business rules server 110. As a partition unit completes execution through a business rules application, the resulting output of the operation on the partition unit must be combined with the output of the operation on all other partition units to generate the final output required by the business rules application that was executed. Each partition unit contains key information and other identifying information that allows its processed output to be linked with the processed output of all the other partition units involved in the operation. The combination component 128 gathers the output from processing of all the partition units, reads identifying and linking information in each unit of output, and combines all of the units of output to produce the final product of the business rules application for the service requester device 150 that submitted the business rules application.

Because partition units fed to the processors of the business rules server 110 by the parallel execution component 126 may not be of a uniform size and may not be subjected to the same processing instructions, the output from the processing of partition units may not be generated in the order in which the partition units were fed to the processors. The combination component 128 identifies each individual portion of output as it is produced and organizes each portion similar to the pieces of a puzzle or patches of a quilt arriving from production out of order until all pieces of output are received and the final, whole result may be assembled.

In an embodiment, the functioning of the combination component 128 may not be necessary. A partition unit may contain data that when processed by the business rules server 110 using the instructions of the business rules application produces output that does not need to be linked or combined with the output of any other partition unit being processed. In an embodiment, a business rules application may involve the processing of data that may all fit into a single partition unit.

Much of the functionality of the present disclosure may be achieved through the use of control files and wrapper scripts deployed by the utilities of the business rules processing application 120. Software modules may be created that are reusable as different business rules applications are submitted for execution.

The storage device 130 is associated with the business rules server 110 and stores data in sequential format in the flat files 132, 134, 136, 138 that are created by the extraction and storage component 122. When the business rules processing application 120 receives a business rules application from a service requester device 150 for execution, it submits the at least one database query to the database 140 or data access request to the non-database source 170 prescribed by the business rules application. When the results of the at least one database query or data access request are received from the database 140 or non-database source 170, respectively, the extraction and storage component 122 writes the results in sequential format to an existing flat file 132 or a new flat file 132 that it creates in the storage device 130. The storage device 130 comprises magnetic storage media or optical storage media stored in hard drives, digital vinyl disks (DVD), magnetic tape drives, or optical jukeboxes. In an embodiment, the storage device 130 may physically reside inside the business rules server 110.

The database 140 stores records used by the business rules processing application 120 to process queries required by business rules applications. The database 140 may be implemented in a variety of manners known to those skilled in the art, including as a relational database or according to some other data storage/access principles.

The service requester devices 150, 152, 154 submit business rules applications to the business rules processing application 120 for processing. In an embodiment, a business rules application is executed on a regular basis, for example daily, weekly, or monthly, using data generated periodically and inserted into fields within the business rules application or fields within database queries or other data access requests ordered by the business rules application. In an embodiment, a business rules application is stored on the business rules server 110 and the service requester device 150 sends requests to the business rules processing application 120 to execute the business rules application which includes updating and submitting required database queries or other data access requests. In an embodiment, once the business rules application is stored on the business rules server 110 and its processing schedule set with the business rules processing application 120, the service requester device 150 does not need to take any specific action for the business rules application to be run on its regular basis with results produced and distributed as directed.

In an embodiment, service requester devices 150, 152, 154 are desktop or laptop computers used by individuals who work, for example, in the finance department or affiliate relations department of a mobile telephone service provider. These personnel may need to regularly run applications that require a large amount of customer or financial data to be extracted from a company database using queries or from non-database sources 170 using data access requests. In another embodiment, service requester devices 150, 152, 154 may be servers, server farms, or other components (not shown) that may or may not be components of the system 100 that may request the services of the system 100. The query results are subjected to several manipulations and computations that involve business rules, processed through join and summarization operations outside the database 140, and printed for distribution. The personnel using the service requester devices 150, 152, 154 invoke the processing of the business rules application by sending instructions to the business rules processing application 120. In an embodiment, a user of the service requester device 150 may schedule the regular execution of a business rules application that is run once per week during the night or on a weekend so as not to consume computing resources needed by critical applications. When the user returns to the office, the business rules application has been completed and the output is ready for the user to review and distribute.

The network 160 promotes communication between the components of the system 100. The network 160 may be any communication network including a public data network (PDN), a public switched telephone network (PSTN), a private network, and/or a combination thereof.

The non-database source 170 is a source of data to be subjected to partitioning and business rules processing wherein the data does not originate from a relational or other database, for example the database 140. Data originated from the non-database source 170 may be received by the extraction and storage component 122 in any of the various file formats commonly in use. As with files originating from the database 140, the extraction and storage component 122 removes formatting and other control characters from data originating from the non-database source 170, converts the data to sequential format and stores the data in the storage device 130.

Figure 2:
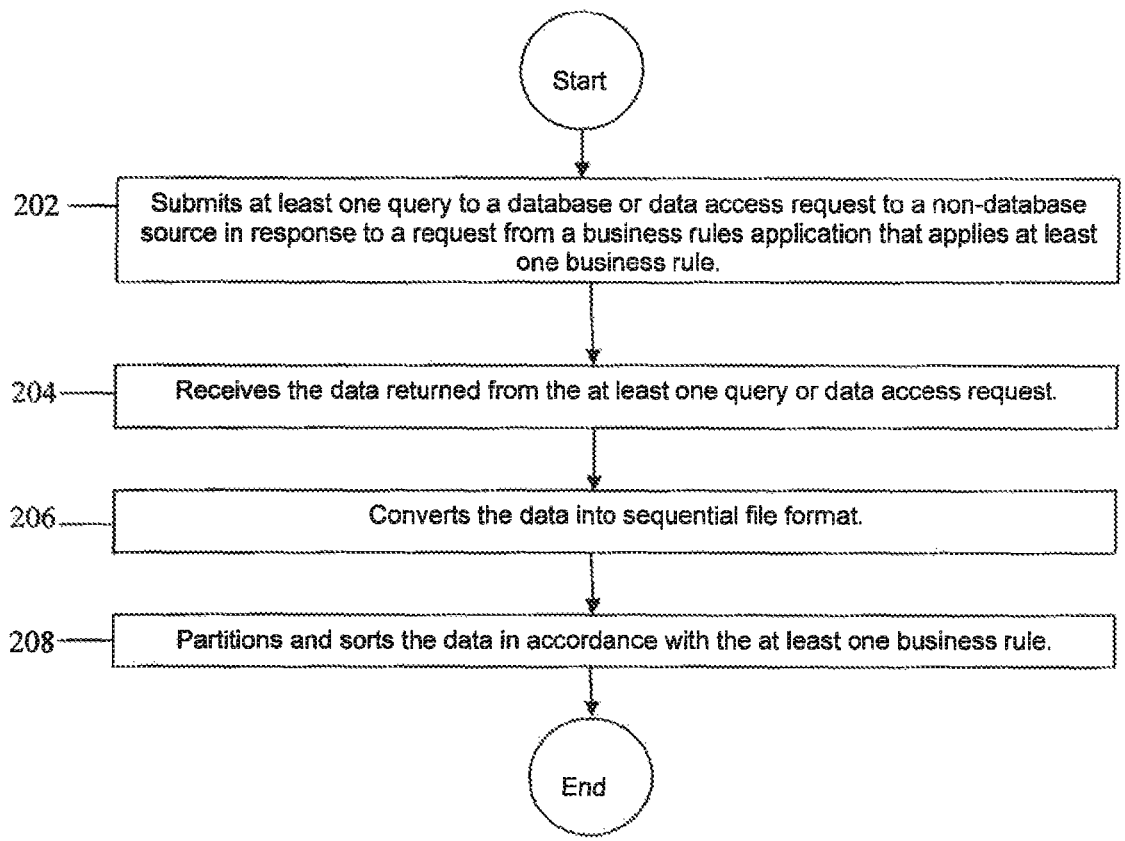
FIG. 2 is a flow chart illustrating a method according to an embodiment of the disclosure.

Turning now to FIG. 2, a method 200 for processing business rules applications is provided. Beginning at block 202, the extraction and storage component 122 of the business rules processing application 120 submits at least one query to the database 140 and/or data access request to the non-database source 170. The at least one query is submitted by the extraction and storage component 122 in accordance with instructions read from a business rules application by the business rules processing application 120. At block 204, the extraction and storage component 122 receives the results of the at least one query from the database 140. If, for some reason, the database 140 returns an error because the query is incorrectly written, incomplete, or the query results contain incomplete or corrupt data, the business rules processing application 120 contains functionality to notify the service requester device 150 that originated the request.

At block 206, the extraction and storage component 122 converts the results of the at least one query received from the database 140 or results of the data access request received from the non-database source 170 into sequential file format. This action may involve removing database formatting information and control characters from the query results and providing reference keys to columns or rows of data in the resulting sequential files. Database vernacular may refer to these resulting files as flat files. Flat files 132, 134, 136, 138 either already existed or were created by the extraction and storage component 122 at the time of need. The operations of the business rules processing application 120 and other components of the system 100 in the method 200 and other methods suggested by the present disclosure may involve the creation and deletion of flat files 132, 134, 136, 138 during the execution of the methods. One or more flat files 132, 134, 136, 138 may comprise a data set. A partition unit as described herein may comprise a single flat file 132, 134, 136, 138 or may comprise a plurality of flat files 132, 134, 136, 138.

At block 208, the partitioning component 124 partitions the data in sequential format in accordance with the instructions provided in the business rules application. In an example involving a customer information table extracted from a database 140 and converted into sequential format, rows may comprise several thousand subscriber identification numbers. Columns in the table provide the account number, telephone number, and subscription plan type for each subscriber identification number. The business rules application may require that a separate table be created wherein the account number is listed as the row item in numeric order with corresponding subscriber identification number as the column item. Requirements may also call for another table to be similarly constructed with telephone number as the row item broken out by customer area code and subscriber identification number as the column item. A third table might also be required with subscription plan type as the row item and subscriber identification number as the column item. The three new tables may need to be further partitioned using other criteria so that the end result may be several tables with only several hundred row items each and segmented by very specific criteria. This process of partitioning and further partitioning takes place before any table joins or summarization occur. Partitioning at block 208 comprises segmenting a large volume of data using various criteria to winnow down the population of records pursuant to instructions read by the business rules processing application 120 during execution of the business rules application. At block 208, the records in the tables are also sorted per the instructions in the business rules application. In an embodiment, some or all of the tables produced in the method 200 may be complete per the business rules application that requested them and may be ready for distribution to users. Additional processing, that may include joining and summarizing, may not be required by the business rules application.

Figure 3:
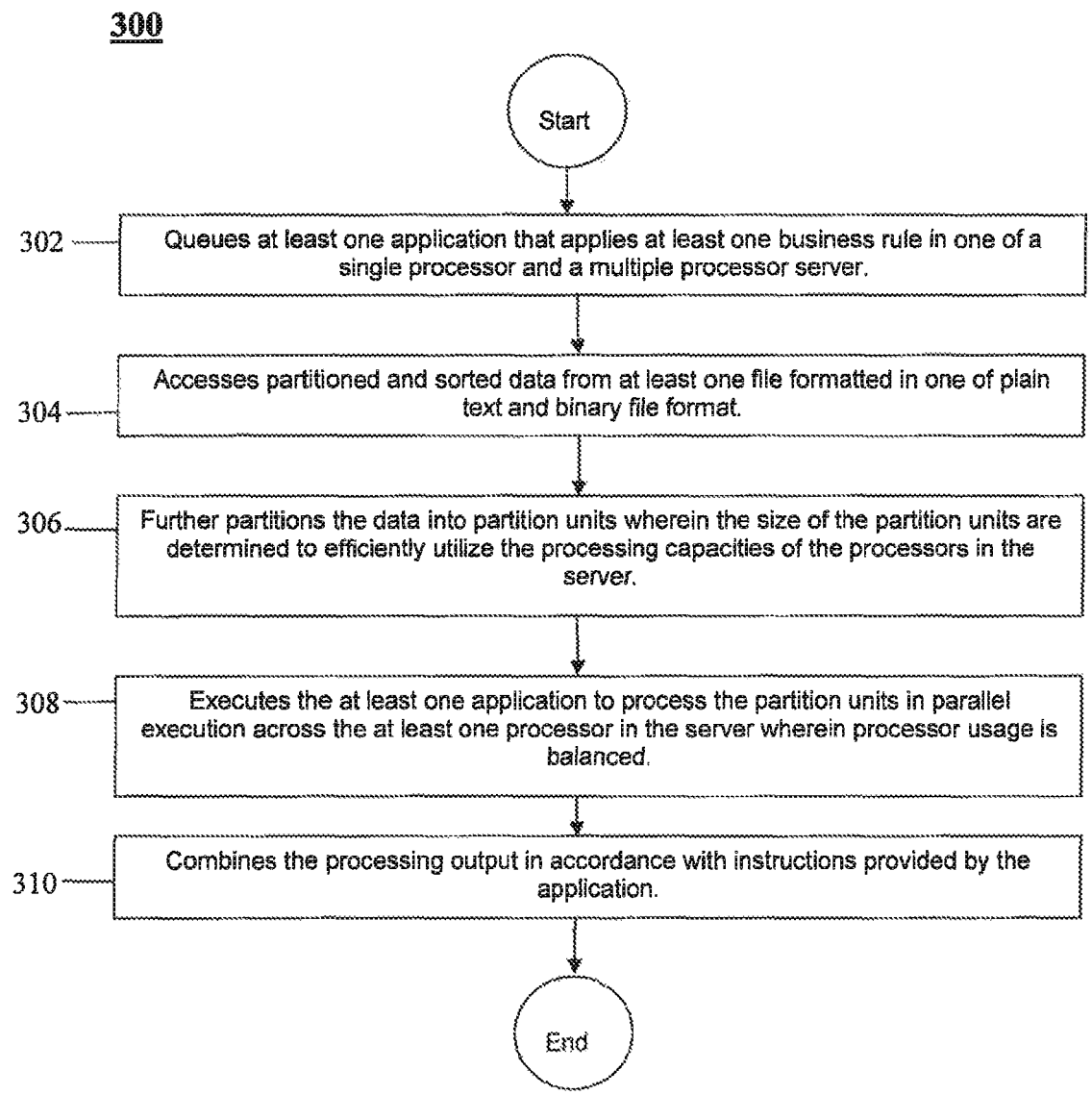
FIG. 3 is a flow chart illustrating another method according to an embodiment of the disclosure.

Turning now to FIG. 3, a method 300 for parallel processing of business rules applications is provided. In some embodiments, the steps in the method 300 may be a continuation of the steps of the method 200. The method 200 dealt with the initial querying of data from the database 140, conversion of the data to sequential file format, and the partitioning of the data. The method 300 takes flat file data that may have been subjected to partitioning, in order to break the data into partition units sized to work with the processors in the business rules server 110, and processes the partition units in join, summarization, and/or other relational operations.

Beginning at block 302, the business rules processing application 120 queues a business rules application to execute on the business rules server 110. The business rules application may have been queued to run because it was submitted for immediate processing by the service requester device 150 or it may have been queued to run because it is scheduled to run at the same time every week or every month, for example. In an embodiment, the business rules application may already have been queued and previously running to cause the partitioning component 124 at block 210 of the method 200 to partition the data in the flat file 132 that resulted from the queries sent to the database 140 or data access requests sent to the non-database source 170. In an embodiment, data may have been extracted from the database 140 or non-database source 170 and partitioned at block 210 of the method 200 and stored in flat files 132 in preparation for use by more than one business rules application. On a monthly basis, a large quantity of data may be queried from the database 140 or accessed from the non-database source 170, converted to text, copied to the storage device 130, and subjected to partitioning. The partitioned data may remain in text files in partitioned form during the month while a plurality of business rules applications are run that draw on copies or instances of the partitioned data stored in the storage device 130. If more than one business rules application uses the same data, the data need only be queried or accessed a single time from the database 140 or non-database source 170, respectively.

At block 304, the business rules processing application 120 draws the partitioned and sorted data from the storage device 130 that is needed for execution by the business rules application. Routines in the business rules application identify the data that is to be taken from the storage device 130 and how that data is to be processed. At block 304, instructions from the business rules application are processed by the business rules processing application 120 to draw the needed data from the storage device 130.

At block 306, the data drawn from the storage device 130 at the instruction of the business rules application is segmented into partition units of a size that may be processed efficiently by the processors in the business rules server 110. The business rules processing application 120 considers the processing resources in the business rules server 110 including processor capacity. It considers the processing tasks being requested by the business rules application that may include various relational join and summarization operations. The business rules processing application 120 also considers processing load currently running on the business rules server 110 that may have an impact on the processing of the business rules application. The business rules processing application 120 considers these factors and segments the partitioned data further into partition units of the size determined to use the processing resources of the business rules server 110 in as resource efficient a manner as possible.

At block 308, the partition units are fed to the processors of the business rules server 110 by the parallel execution component 126 as join, summarization or other relational execution operation steps begin in the business rules application. The parallel execution component 126 monitors processor activity and regulates the passage of partition units to the processors as they complete work on partition units that includes the join and summarization activities and applying of business rules called for in the application code. As this processing completes, the output from the processing of each partition unit is held ready for final assembly by the combination component 128.

At block 310, the combination component 128 assembles all of the individual output results from the processing of the partition units at block 308. The individual output results contain coding that the combination component 128 reads and uses to sequence the individual output results in the correct order for delivery back to the service requester device 150.

Figure 4:
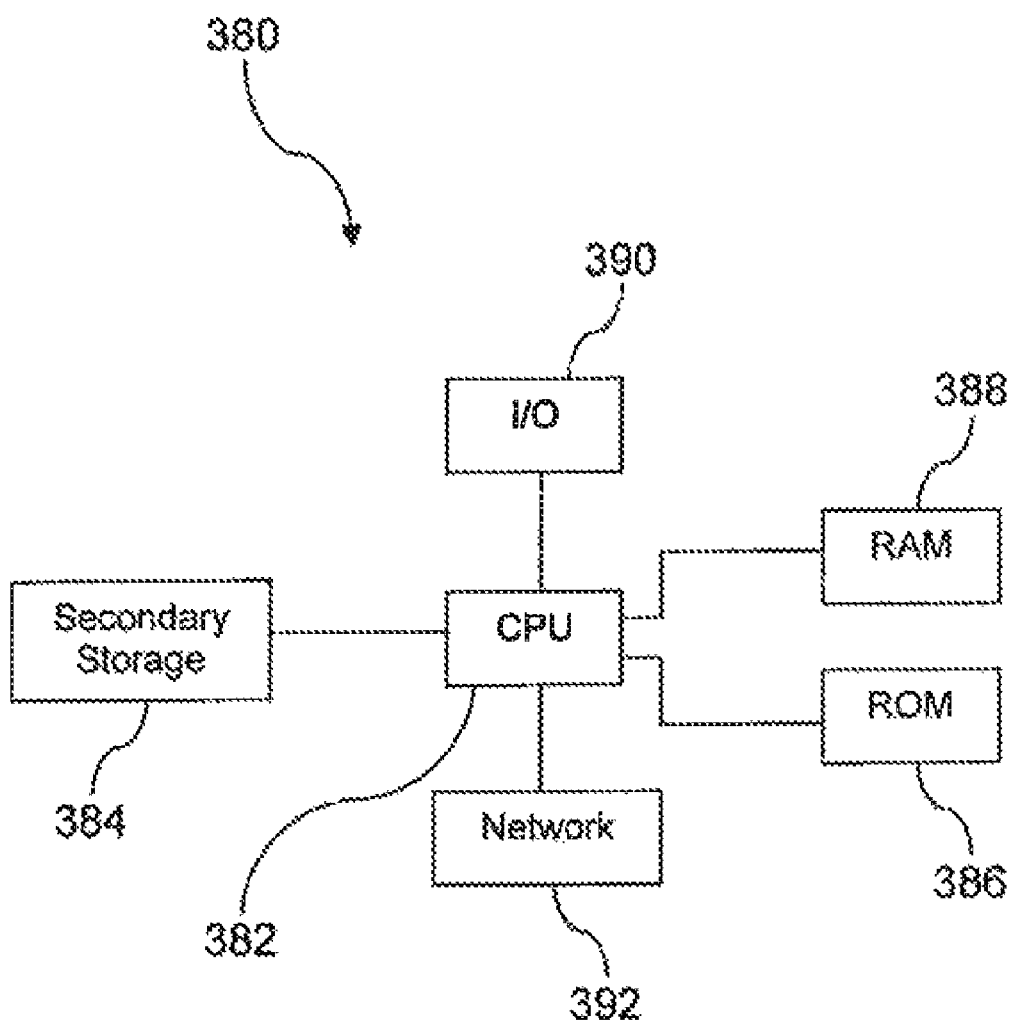
FIG. 4 illustrates an exemplary general purpose computer system suitable for implementing some aspects of the several embodiments of the disclosure.

Some aspects of the system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Figure 5:
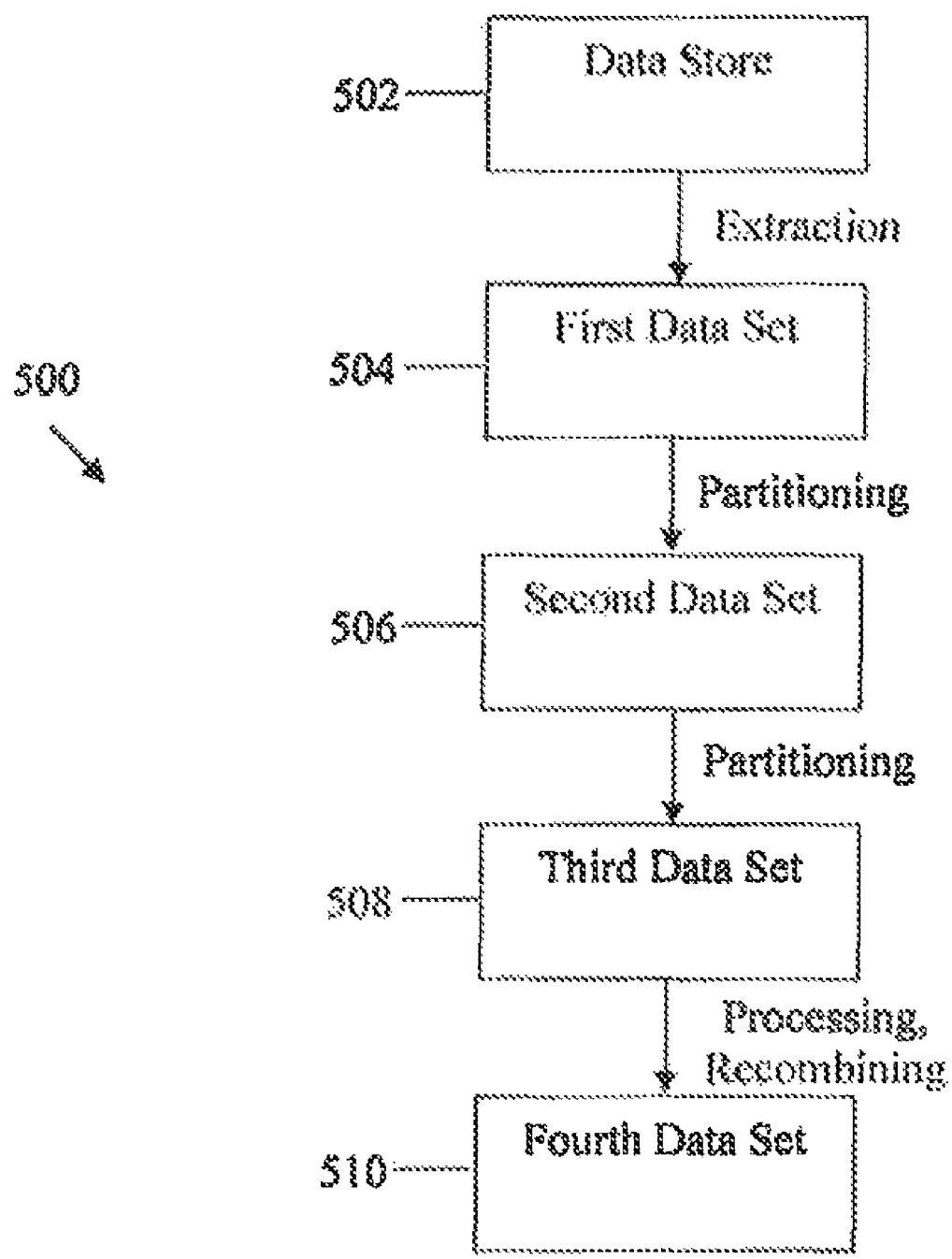
FIG. 5 illustrates an exemplary data processing flow in accordance with an embodiment of the disclosure.

FIG. 5 illustrates an exemplary data processing flow 500 in accordance with an embodiment of the disclosure. In the data processing flow 500, data is extracted from data source 502 for processing in accordance with at least one business rule. The extracted data is stored in a sequential file format at the first data set 504. The data in the first data set 504 is partitioned in accordance with the at least one business rule to create a second data set 506 and to prepare the data in the second data set 506 for processing. The data in the second data set 506 is partitioned into partition units appropriate for scaled application processing across multiple processors to create a third data set 508. The data in the third data set 508 is processed in parallel execution across multiple processors and is recombined after processing in accordance with the at least one business rule as a fourth data set 510.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A business rules application parallel processing system, comprising:
   at least one computer system;
   a data source with stored data; and
   an application that, when executed on the at least one computer system, performs a two-part parallel processing procedure external to the data source,
   wherein a first part of the two-part parallel processing procedure comprises,
      performing a query to extract data from the data source for processing in accordance with at least one business rule applied by at least one business rules application;
      storing data extracted from the data source in a sequential file format as a first data set;
      partitioning the data in the first data set in accordance with the at least one business rule to create a second data set and to prepare the data in the second data set for processing;
   wherein a second part of the two-part parallel processing procedure comprises,
      queuing the at least one business rules application in the at least one computer system;
      accessing the partitioned data from the second data set;
      partitioning the accessed data into partition units appropriate for scaled application processing across multiple processors in the at least one computer system to create a third data set;
      processing the data in the third data set in a parallel execution across the multiple processors wherein processor usage is balanced and processing comprises at least one of join and summarization operations to produce a processing output; and
      combining the processing output after said processing in accordance with the at least one business rule of the at least one business rules application as a fourth data set, and
   wherein the application is configured to perform the first part of the two-part parallel processing procedure less often than the second part of the two-part parallel processing procedure to efficiently apply different business rules during the second part to data queried from the data source during the first part.

2. The system of claim 1, further including configuration files and wrapper scripts wherein the application processes the data based on the configuration files and the wrapper scripts.

3. The system of claim 1, wherein the data source is a relational database.

4. The system of claim 1, wherein the data stored in sequential file format is stored in a flat file.

5. The system of claim 1, wherein the application processes the data in parallel execution across multiple processors, monitors processor usage, and promotes load balancing across processors.

6. The system of claim 1, wherein the data extracted from the data source in accordance with the at least one business rule is processed in a data warehouse application.

7. A method for parallel processing business rules applications, comprising:
   performing a two-part parallel processing procedure external to a database,
   wherein a first part of the two-part parallel processing procedure comprises,
      submitting at least one query to the database in response to a request from a business rules application that applies at least one business rule;
      storing data returned from the at least one query in a sequential file; and
      partitioning and sorting the data from the sequential file,
   wherein a second part of the two-part parallel processing procedure comprises,
      queuing the at least one business rules application that applies the at least one business rule in a multiple processor server;
      accessing the partitioned and sorted data;
      partitioning the accessed data into partition units wherein the size of the partition units are determined to efficiently utilize the processing capacities of processors in the multiple processor server;
      executing the at least one business rules application to process the partition units in parallel execution across a plurality of the processors in the multiple processor server wherein processor usage is balanced and processing comprises at least one of join and summarization operations to produce a processing output; and
      combining the processing output in accordance with instructions provided by the at least one business rules application, and
   wherein the first part of the two-part parallel processing procedure is performed less often than the second part of the two-part parallel processing procedure to efficiently apply different business rules during the second part to data queried from the database during the first part.

8. The method of claim 7, wherein each business rule enforces an organizational policy.

9. The method of claim 7, wherein data arranged in sequential file format is arranged using a key field.

10. The method of claim 7, wherein data is partitioned using range partitioning.

11. The method of claim 7, wherein data is partitioned using hash partitioning.

12. The method of claim 7, wherein data stored in the sequential file is stored in one of plain text and binary format.

13. The method of claim 7, wherein when at least two business rules applications use the same data, the data is copied into a sequential file and copies of the data are created and used by the at least two business rules applications.

14. A method for parallel processing business rules applications, comprising:
   performing a two-part parallel processing procedure external to a database,
   wherein a first part of the two-part parallel processing procedure comprises sorting and partitioning data queried from the database as at least one file formatted in one of plain text and binary file format,
   wherein a second part of the two-part parallel processing procedure comprises,
      queuing at least one application that applies at least one business rule in a multiple processor server;

accessing the partitioned and sorted data from the at least one file formatted in one of plain text and binary file format;

partitioning the accessed data into partition units wherein the size of the partition units are determined to efficiently utilize the processing capacities of processors in the multiple processor server;

executing the at least one application to process the partition units in parallel execution across a plurality of the processors in the server wherein processor usage is balanced and processing comprises at least one of join and summarization operations to produce a processing output; and combining the processing output in accordance with instructions provided by the at least one application, and wherein the first part of the two-part parallel processing procedure is performed less often than the second part of the two-part parallel processing procedure to efficiently apply different business rules during the second part to data queried from the database during the first part.

15. The method of claim 14, executing the at least one application includes applying the at least one business rule.

16. The method of claim 14, wherein the at least one application uses relational join operations between tables in the partitioned data.

17. The method of claim 16, wherein configuration files define instructions on the table fields to use in completing join operations.

18. The method of claim 14, wherein the at least one application promotes summarization operations in which a reduced version of a table is produced.

19. The method of claim 14, wherein a first partition unit is processed independent of a second partition unit and a first processor performs join and summarization operations on a partition unit independent of a second processor.

* * * * *